United States Patent [19]
Amano et al.

[11] Patent Number: 5,119,119
[45] Date of Patent: Jun. 2, 1992

[54] DATA IMPRINTING DEVICE

[75] Inventors: Kenichiro Amano, Tokyo; Jiro Kazumi, Kanagawa; Sinichi Tsujimoto, Tokyo; Kenji Itoh; Masaaki Ishihara, both of Kanagawa, all of Japan

[73] Assignee: Canon Kabushiki Kaisha, Tokyo, Japan

[21] Appl. No.: 652,207

[22] Filed: Feb. 5, 1991

Related U.S. Application Data

[63] Continuation of Ser. No. 372.226, Jun. 26, 1989, abandoned, which is a continuation of Ser. No. 103,289, Oct. 1, 1987, abandoned.

[30] Foreign Application Priority Data

Oct. 8, 1986 [JP] Japan .............................. 61-238009
Oct. 8, 1986 [JP] Japan .............................. 61-238010

[51] Int. Cl.⁵ .................................................. G03B 17/24
[52] U.S. Cl. ................................................... 354/106
[58] Field of Search ..................................... 354/106

[56] References Cited

U.S. PATENT DOCUMENTS 4,361,388 11/1982 Mlcak ................................ 354/106

FOREIGN PATENT DOCUMENTS 60-254123 5/1984 Japan.
1564712 4/1980 United Kingdom.

Primary Examiner—Michael L. Gellner
Attorney, Agent, or Firm—Fitzpatrick, Cella, Harper & Scinto

[57] ABSTRACT

A data imprinting device of the type in which data are imprinted on the film surface during the time when the film is transported. The device includes a data exposure device positioned on the presser plate which presses the film against the film gate of the camera in fixedly secured relation at a location corresponding to the vicinity of the path of movement of the film and a prohibitor responsive to accidental interruption of the film transportation for prohibiting further imprinting of data until the next frame, which came across the data exposure making device at the time of the accidental interruption, is brought into alignment with the data exposure making means as the film transportaion has been re-started.

28 Claims, 9 Drawing Sheets

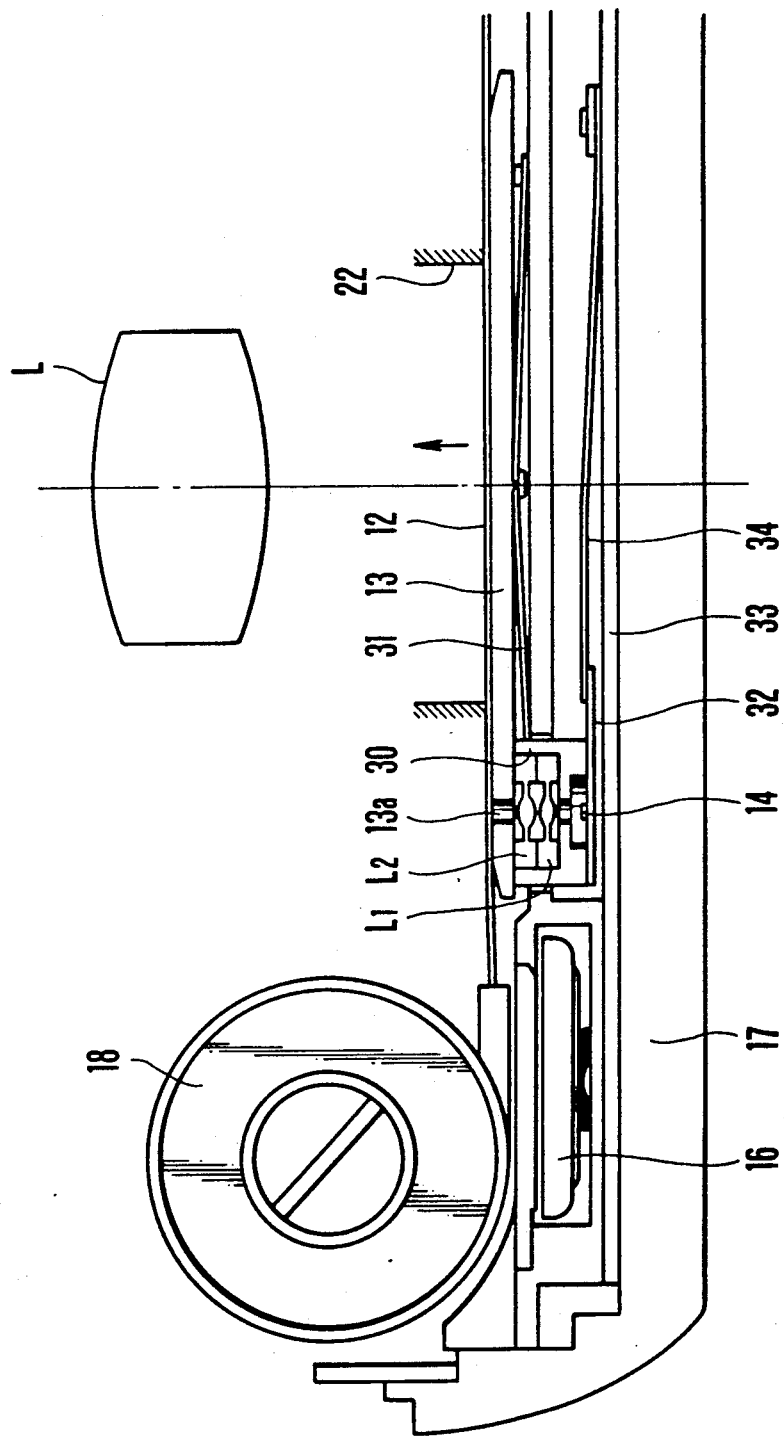

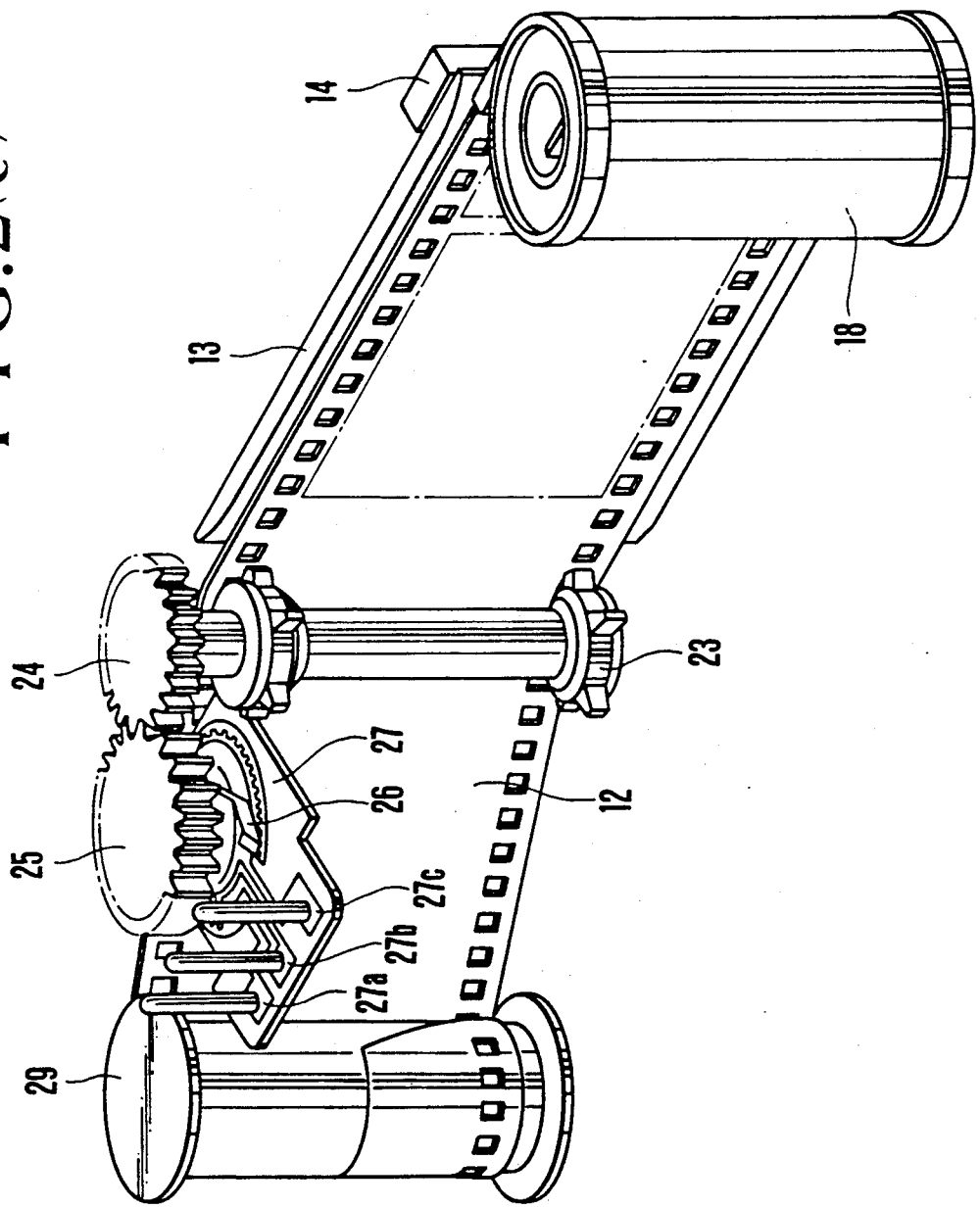

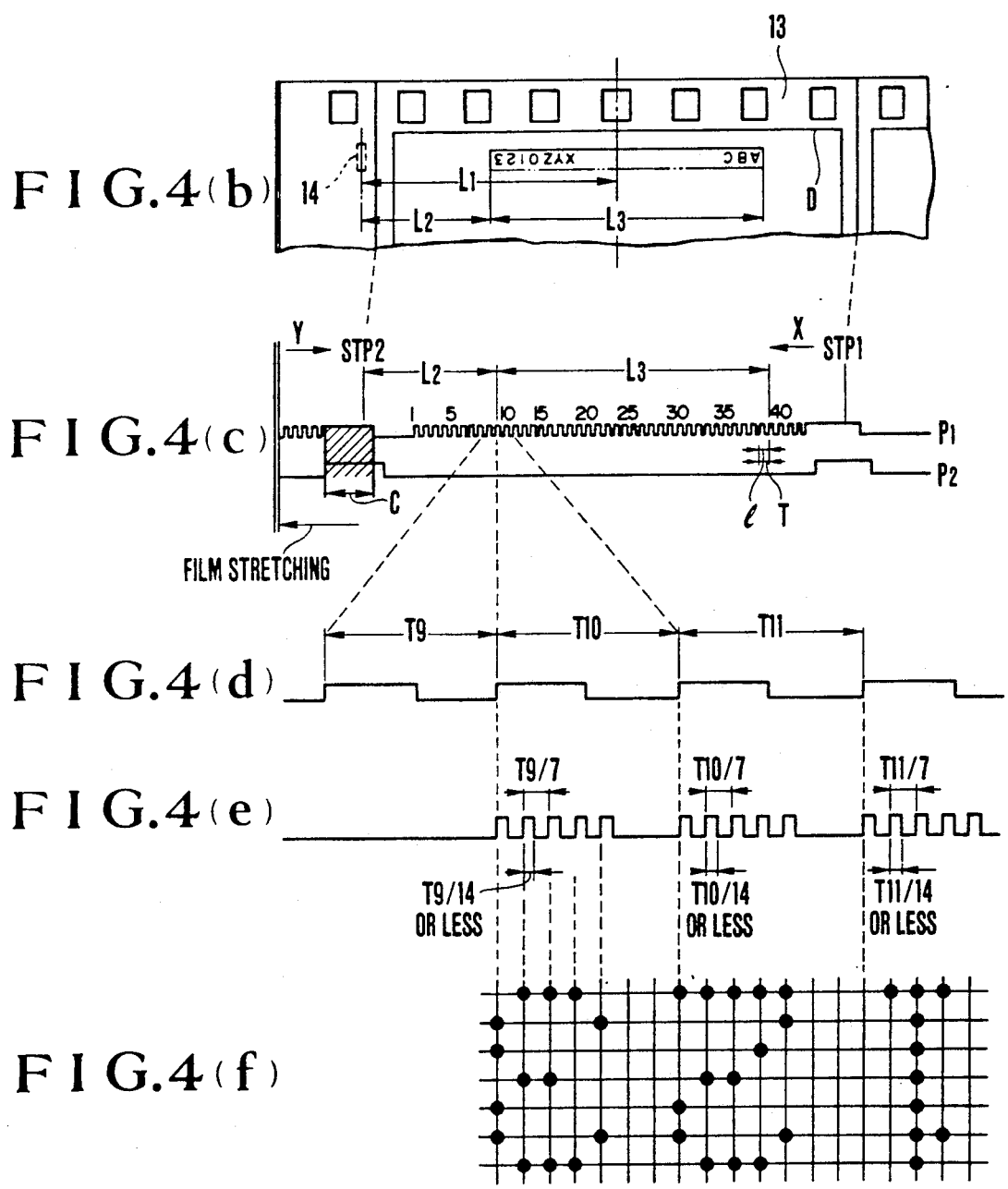

DATA IMPRINTING DEVICE

This application is a continuation of application Ser. No. 07/372,226 filed on Jun. 26, 1989, which is a continuation of application Ser. No. 07/103,289 filed on Oct. 1, 1987, both applications now abandoned.

BACKGROUND OF THE INVENTION

1. Field of the Invention

This invention relates to improvements of the data imprinting device for imprinting data such as dates of shots in year, month and day on a film surface by data imprinting means during the transportation of the film.

2. Description of the Related Art

A device of this sort employs the method that once stored in a memory when the camera is released, data such as the date of a shot, (i.e. the year, month and day) while being read out from the memory are imprinted on the film as it is being rewound, as disclosed, for example, in Japanese Laid-Open Patent Application No. Sho 60-254123. Such a device is suited particularly to a camera in which the transporting of film is motorized. This conventional type of device has, however, the drawbacks that either just after the start of film rewinding, or in the case of an interruption of the film rewinding due to the exhaustion of the battery followed, after the exchange of the battery, by the re-start of rewinding the remaining frames of film, the space between the successively imprinted letters on the moving film differs at random, or a letter itself is imprinted with a large deformation to be discretely unreadable as the data, because there is a backlash in the gear train of the film transportation mechanism, and the ramping characteristic of the motor or the slaking of the film varies the speed of movement of the film to large extent (see FIG. 7).

SUMMARY OF THE INVENTION

An object of the present invention is to eliminate the above-described drawbacks and to provide a data imprinting device with means making it possible to prevent data from being imprinted both in illegible form and at irregular intervals despite the performing of imprinting when the film is being transported, so that all the imprinted data are easy to read, and to obviate the influence of the instability of the axial position of the film plane on the sharpness of the imprinted data.

To achieve the above-described objects in a data imprinting device of the type in which it is during the transportation of film that the data are imprinted on the film surface, the present invention has a feature that the means for making exposure of data is fixedly mounted on the presser plate for the picture frame in close contact on the film gate at a location corresponding to the vicinity of the path of the film. In addition, another feature is that the initiation of a data imprinting operation by the above-described data exposure making means is deferred from the start of the film transportation as long as is acceptable, thereby imprinting the data at a time when the speed of movement of the film is stabilized, while the data exposure making means is rendered to follow up the wavy movement of the film in a direction parallel to the optical axis of the photographic lens.

Further, to achieve the above-described object, the present invention provides the data imprinting device of the type described above with prohibiting means operating in such a manner that if, as the aforesaid film transportation is not normally carried out, the film stops halfway, and further imprinting of data is prohibited until the next picture frame, whose exposure to the data has been interrupted, comes in alignment with the aforesaid data exposure making means as the film transportation proceeds. Thus, the imprinted data are prevented from becoming ugly even in the picture frame which came across the data exposure making means when the film stopped, since the imprinting is made to take place only when motion of the film is well stabilized.

Other objects of the invention will become apparent from the following description of the preferred embodiments thereof.

BRIEF DESCRIPTION OF THE DRAWINGS

FIGS. 2(a), 2(b) and 2(c) illustrate the mechanical structure of the main parts of the device.

FIGS. 4(a) to 4(f) are taken to explain how to control the timing of data exposure.

DETAILED DESCRIPTION OF THE PREFERRED EMBODIMENTS

The present invention next is described in detail on the basis of illustrated embodiments.

Figure 1A:
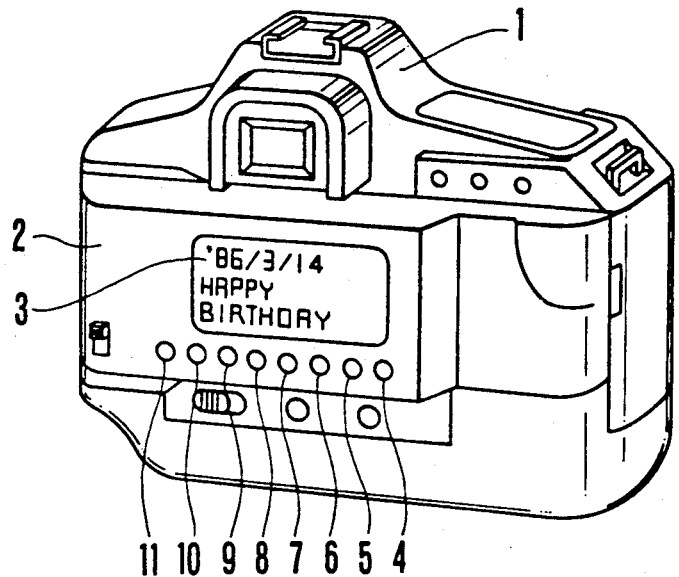
FIGS. 1(a) and 1(b) are perspective views of a camera employing an embodiment of a data imprinting device according to the invention.
Figure 1B:
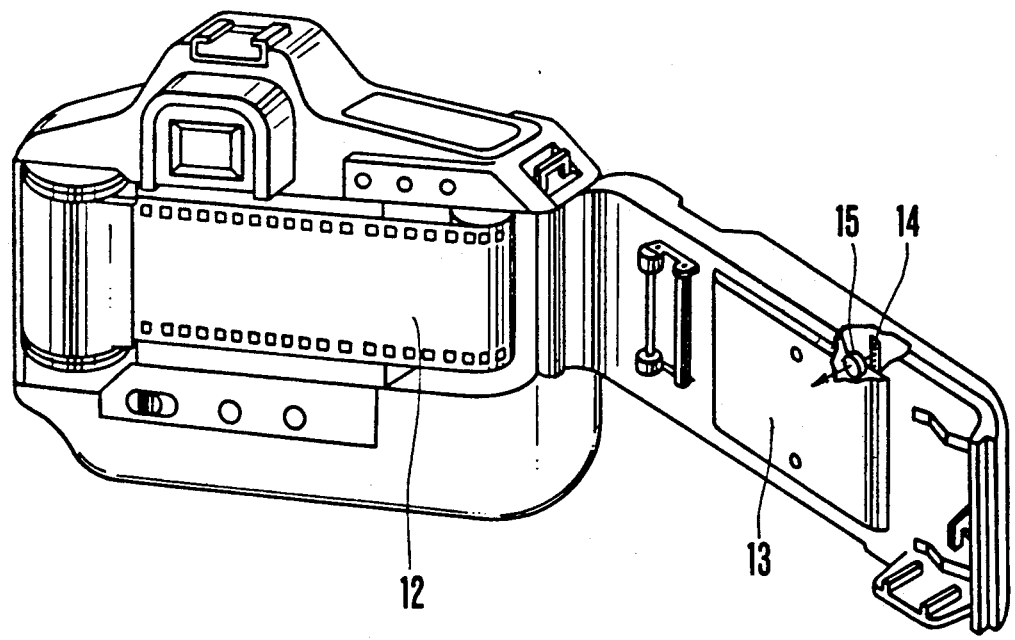
Figure 2B:
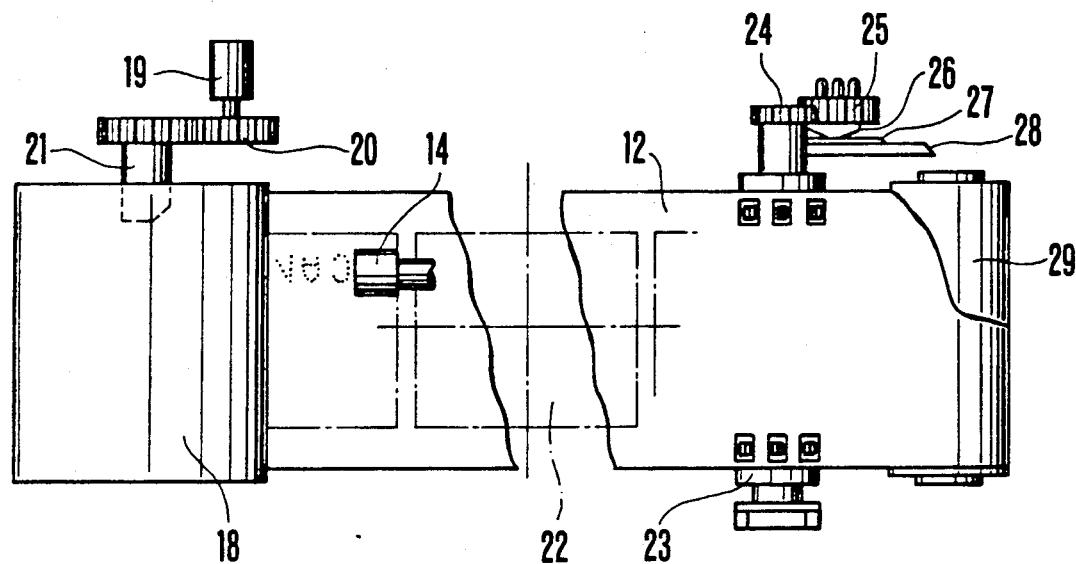
Figure 3:
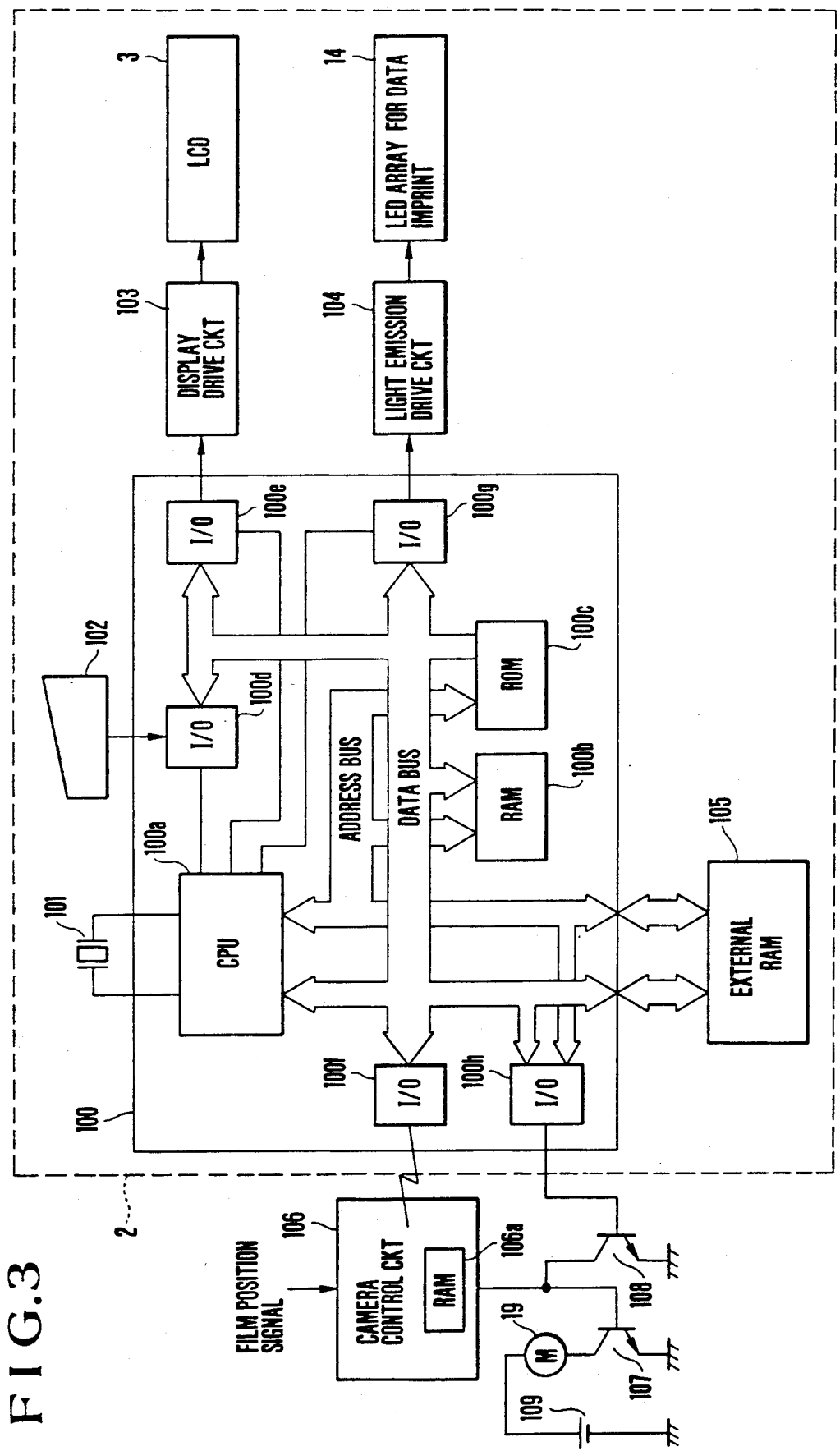
FIG. 3 is an electrical circuit diagram, partly in block form, of the device of FIG. 1(a).

FIGS. 1(a)-3 show one embodiment of the invention with FIGS. 1(a) and 1(b) being perspective views viewed respectively from the rear and front of the data imprinting device of this embodiment set in the camera, FIGS. 2(a), 2(b) and 2(c) being respectively top, side elevational and perspective views of the main parts of the device, and FIG. 3 being a block diagram of the circuitry of the device.

In FIGS. 1(a) and 1(b), the camera housing 1 has a back cover equipped with the data imprinting device 2. Photographic data such as the date the year, the month and day to be imprinted are externally displayed on a liquid crystal display device (LCD) 3. To preset or correct the data to be imprinted, there are a row of eight keys 4-11 called "clear", "cursor (leftward)", "down", "up", "cursor (rightward)", "set", "on-off" and "rewind" respectively. The "on-off" key 10 is used for setting the flag for imprinting to "1" or "0". A presser plate 13 for film 12 fixedly carries an LED array 14 for making exposure of data in the form of an array of seven light-emitting diodes (LEDs) in the perpendicular direction to the path of the film 12 and an optical system 15 positioned in front of the LED array 14.

In FIGS. 2(a), 2(b) and 2(c), L denotes a photographic lens; 16 a battery; 17 a back cover; and 18 a film cartridge. An electric motor 19 whose drive is controlled by a camera control circuit to be described later is used to rewind the film 12 through a 2-stage gear 20 and a fork 21. 22 denotes an aperture. A sprocket 23 is rotated in engagement with the perforations of the film 12 when the film 12 is being rewound. A gear 24 is fixedly mounted on the top end of the sprocket 23, and meshes with a signal gear 25 whose lower surface fixedly carries a signal contact 26. A spatial encoder 27 is constructed as shown in FIG. 2(c) from three circular tracks of patterns 27a to 27c leading to respective output pins (to be more fully described later by using FIG. 4). When the signal contact 26 slides on the encoder 27, the position of the film 12 and the timing of exposure of data are detected. 28 denotes a base plate. 29 denotes a takeup spool.

The presser plate 13 is provided with a hole portion 13a out of alignment with the aperture 22 at as close a location to a chamber for the cartridge 18 as possible in the vicinity of the path of the film 12. Positioned just behind this hole portion 13a is the optical system 15 of lenses L1 and L2 in a holder 30 fixedly secured to the presser plate 13 by screw fasteners (not shown) (see FIG. 2(a)). A leaf spring 31 urges the presser plate 13 axially forward (in a direction indicated by arrow in FIG. 2(a)) so that the film 12 is in close contact between the aperture 22 and the presser plate 13. A substrate 32 having the LED array 14 fabricated thereon is fixedly mounted to the back of the lens holder 30 and is electrically connected through a flexible printed circuit board 34 to a main hard board 33 fixed to the back cover 17. With the foregoing, despite the film 12 waves in the direction parallel to the optical axis of the photographic lenses L1 and L2 when it is rewound, because the optical system 15 and the LED array 14 on the presser plate 13 also move in accompaniment to it, the relative position of the data exposure making means to the film 12 can be maintained constant.

In FIG. 3, a microcomputer 100 for controlling the operation of whole the data imprinting device 2 includes a CPU 100a, a RAM 100b for storing various classes of data and information that are to become necessary at the time of data imprinting from the camera, and a ROM 100c containing a program of instructions for imprinting data and is equipped with input-output units 100d to 100h. A quartz oscillator 101 produces a train of reference clock pulses. All the keys 4 to 11 shown in FIG. 1(a) are represented by a console 102. The LCD 3 for displaying what data are to be imprinted is driven by a display drive circuit 103 in response to signals from the microcomputer 100. The seven LEDs in the array 14 as the light source for making exposure of data are selectively turned on and off by a light emission drive circuit 104 in response to timing signals from the microcomputer 100. An external extension RAM 105 memorizes photographic information and data for imprinting from the camera.

A control circuit 106 for the camera has, as is well known, the functions of controlling exposure of an object image, of controlling transportation of the film in accordance with a signal representing the position of the film from the encoder 27, and of transmitting photographic information (shutter time, aperture value, ISO value, exposure correction factor value, etc.) and data-imprint timing signals to the microcomputer 100 in the data imprinting device 2. This circuit 106 is provided here with a RAM 106a for memorizing the fact that the normal rewinding has failed. A switching transistor 107 is turned on and off depending on a signal from the camera control circuit 106. Another switching transistor 108 is turned on when the storage areas for data to be imprinted in the external extension RAM 105 are not blank or when codes other than that representing the blank are stored therein. It turns off when the rewind key 11 is once pushed down. The collector of the second switching transistor 108 is connected to the base of the first one 107. Note the second switching transistor 108 may otherwise be disposed within the data imprinting device 2. 109 denotes an electrical power source or battery for the rewind motor 19.

Next, using FIGS. 4(a) to 4(f), the encoder 27 and the signal contact 26 slidingly moving on it are described in detail.

Figure 4A:
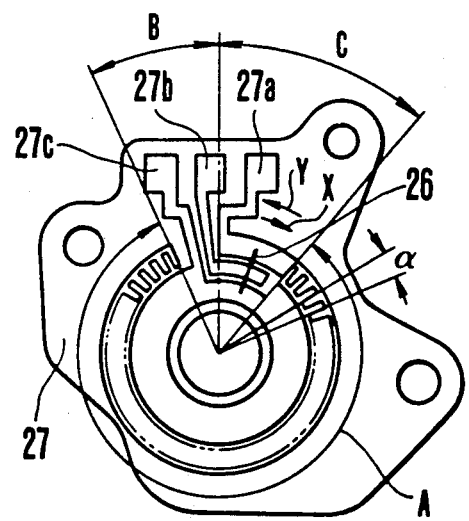

FIG. 4(a) illustrates the above-described encoder 27 fixedly mounted to the base plate 28 of the camera. While sliding on this encoder 27, the signal contact 26 extending from the lower surface of the signal gear 25 moves in the direction of arrow X when the film is wound up, or in the direction of arrow Y when it is rewound. In either case, the signal contact 26 turns around one revolution on the encoder 27 when the film is transported one frame (38 mm for 35 mm film format). Formed on the encoder 27 are three tracks of patterns 27a to 27c of different shapes, of which the track 27c is held at a ground (GND) level of potential.

After the camera is released, when the exposure to a certain frame has been completed, the camera control circuit 106 starts to control the drive of a windup motor (not shown). Thus, winding up of the film 12 is started. Upon this, the signal contact 26 starts to turn in the direction of arrow X from the position of FIG. 4(a). Since the signal contact 26 traverses all the tracks 27a to 27c, turning of the signal contact 26 electrically connects or disconnects the successive patterns in the first two tracks 27a and 27b to or from the other track 27c. FIG. 4(c) illustrates what outputs are then produced at the lead patches of the tracks 27a and 27b at P1 and P2 respectively. For the time during which the film 12 moves a distance equal to the space between the two successive picture frames from the start position of FIG. 4(a), both tracks 27a and 27b are closed (turned on) relative to the track 27c, as shown at the position STP1 in FIG. 4(c).

As the winding up of the film goes on, when the signal contact 26 enters a region A of a great number of pairs of electrically conductive and non-conductive patterns 27a, the pitch of one pair subtending an angle, $\alpha$, the output P1 starts to pulsate with a period T. Since the time space, l, of the period T is proportional to the distance ($=38\times(\alpha/360°)$mm) the film 12 moves, the amount of movement of the film 12 can be detected by counting the number of pulses P1 produced. (In this embodiment, the angular distance of the region A in the track 27a is 43 pitches). It should be noted here that since this period T of output P1 depends on the speed of movement of the film 12, comparison of its actual value with critical levels enables the camera control circuit 106 to detect a loss of electrical power at a time during the film transportation, when the film is stretched, or whether or not the rewinding has normally been carried out. (If not, this fact is memorized in the RAM 106a).

When the film winding operation nears the terminal end, the output P2 changes to a high level again. In a short time, the output P1 also changes to high level. Responsive to such a change of the output P2, the camera control circuit 106 changes the control of the current supply to the windup motor to the duty mode (in which the effective value of the current flowing to the windup motor is lowered), thereby reducing the winding-up speed of the film 12. At the time of detection of the simultaneous occurrence of on-state of both outputs P1 and P2, the current supply to the windup motor is stopped, and an operation of hindering the film 12 from being wound up (a braking operation) is carried out. The winding-up of the exposed frame (one-frame advancement) is thereby completed. Note, even after the termination of the current supply to the windup motor, the windup motor slightly overruns, causing the film 12 also to move. Therefore, the signal contact 26 is moved beyond the edge of the track 27a (the initial position of movement in the direction X) and rests in the position of FIG. 4(a) corresponding to the position STP2 in FIG. 4(c). It is also noted that the duration of the on-state of each of the outputs P1 and P2 at the position STP is far longer than on-off period of the pulse obtained from the region A in the track 27a.

After that, with the signal contact 26 in the position STP2, when the camera is released, the next frame is exposed to the object image. The completion of this exposure is immediately followed by the start of winding up of that frame. Based on the signal of the film position produced from the signal contact 26 and encoder 27, the winding up operation is controlled in a similar manner to that described above by the camera control circuit 106.

The scale in FIG. 4(b) is correlated to the pulse timing chart of FIG. 4(c). Since the film 12 stops at the position STP2, the length of one picture frame (38 mm for 35 mm film format) is determined as the interval between the positions STP1 and STP2. If the shutter is opened in this position, the film 12 is exposed, and a latent image of an object being photographed is formed in an area enclosed within a rectangular frame D. In FIG. 4(b), L1 represents the distance from the center of the picture frame D to the LED array 14 or the light source for data imprinting, and L2 and L3 the location and length of the area in which data are imprinted (in this embodiment, the number of places at which the data can be imprinted is 30 at most). (A detailed explanation of it will be made in connection with the data imprinting operation by reference to FIG. 5).

The above-described camera control circuit 106 not only controls the winding operation (and exposure) as has been described above, but also sends signals representing photographic information such as the shutter time value, aperture value, ISO value, exposure correction value, etc. for each actuation of the aforesaid camera release, and the aforesaid positions of the film (aforesaid outputs P1 and P2) to the microcomputer 100 in the data imprinting device 2. In order to process these signals in timed relationship, the microcomputer 100 is supplied with a reference clock from the quartz oscillator 101. By a reset circuit (not shown), an initial address is set. Then, according to the content of the ROM 100c, the aforesaid data start to be processed.

Figure 5:
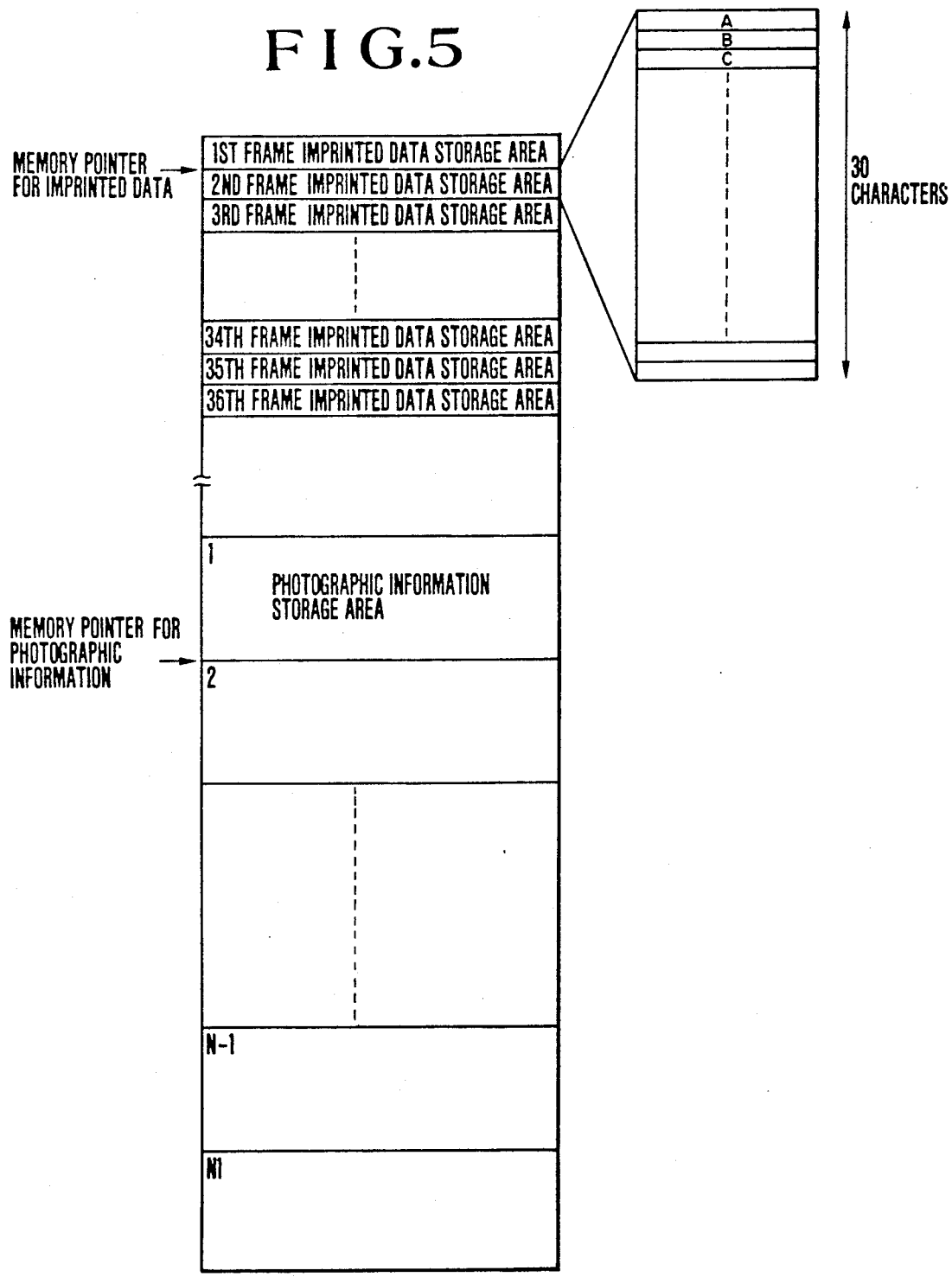
FIG. 5 is a diagram of the locations of data in an external extension RAM used in the device.

Here, before the operation of the data imprinting device 2 is described in detail, what structure the external extension RAM 105 has and how to memorize the photographic information sent from the camera in each actuation of the camera release and the data sent from the console 102 in the external extension RAM 105 are described by using FIG. 5.

As shown in FIG. 5, the storage area is divided into two parts for the data to be imprinted and the photographic information. The former has a capacity of one 36-exposure film cartridge, or as, in this instance, 30 characters per frame are to be imprinted, 36×30=1080 characters.

When a camera release is actuated under the condition that the camera is loaded with the film 12, the data to be imprinted and the photographic information are memorized in the respective parts of the storage area, the former at the location previously assigned to the number of that frame which is presently exposed. If the console 102 was so set as to memorize nothing, it is in the former that a blank code is memorized in the location for that frame, and a pointer is advanced to the next location. In the latter, nothing is memorized, and even the event of advancing the pointer does not take place. In other words, sets of the photographic information to be memorized are allocated to successive addresses in padding relation to the order in which they are sent. When rewinding, all the memorized data to be imprinted are read out successively, beginning with those stored in the location assigned to the last frame, for example, in the case of the 36-exposure film, the 36th frame, and terminating at those stored in the location assigned to the 1st frame.

Whether or not imprinting of the data for the released frame is to be carried out is determined by the flag having "1" or "0" as was set depending on whether or not the on-off key 10 was operated and has been memorized in the RAM 100b. Also, the photographic information memorized in the above-described photographic information storage area are data for use in later resuming what conditions (shutter time, aperture value, etc.) were used in taking the frames individually.

Figure 6:
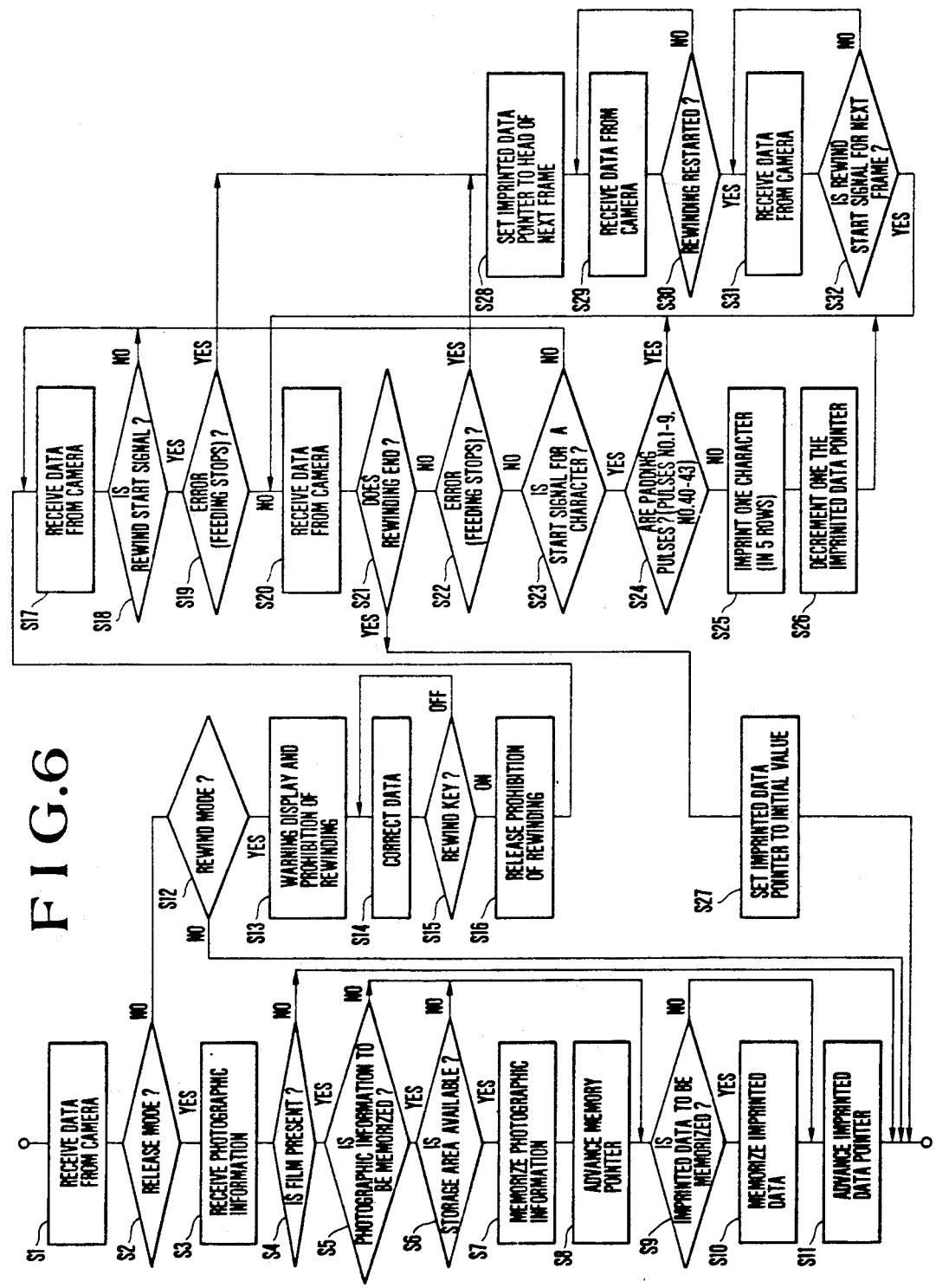
FIG. 6 is a flowchart for making exposure of data read from the RAM.

Referring now to FIG. 6, the operation of the data imprinting device 2 is described by using the flowchart.

Step S1: Receive the data sent from the camera. This data or the first communication has a content representing which mode, release or rewind, the camera operates in.

Step S2: Whether or not the release mode operates is determined. If so, then advance to a step S3, or otherwise to step S12.

Step S3: The values of exposure factors such as shutter time, aperture size, film speed in ISO and exposure correction for which a frame has been exposed are received, and displayed on the LCD 3 through the display drive circuit 103.

Step S4: Whether or not the camera is loaded with the film 12 is tested. If not, then perform no memorization of the photographic information and the imprinted data. In the case when the film 12 is loaded, then advance to a step S5.

Step S5: Whether or not the flag of the photographic information storage has been set in "1" by the console 102 (though the key for setting this flag is not shown in FIG. 1(a)), is determined from the content of the RAM 100b. If so, then advance to a step S6, or otherwise to a step S9.

Step S6: Examine whether or not there is left a location at which new photographic information can be memorized in the photographic information storage area. If not, then advance to step S9. If that location remains available, then advance to a step S7.

Step S7: Memorize the photographic information to the pointer indicating the available location in the photographic information storage area in the external extension RAM 105.

Step S8: Advance the memory pointer when the memorization is complete.

Step S9: Whether or not the flag memorizing the data to be imprinted has been set in "1" by the console 102, (though the key for this flag is not shown in FIG. 1(a)), is determined from the content of the RAM 100b. If so, then advance to step S10, or otherwise to step S11.

Step S10: Before the camera is shot with a frame of film, the console 102 is operated to preset desired data to be imprinted while looking them at the LCD 3. The preset data are memorized in the imprinted data storage area at the location assigned to that frame.

Step S11: Advance the imprinted data pointer when the memorization is complete.

Upon the above, the execution of a program for the release mode terminates.

Meanwhile, in the case of having determined in the step S2 that the mode of the camera is not the release one, advance to step S12 has occurred as has been described above.

Step S12: Examine whether or not the camera is in the rewind mode. If so, then advance to a step S13.

Step S13: A warning display representing the end of the film 12, or which calls a photographer's attention to make sure there is a need to correct the data to be imprinted before the start of rewinding (imprinting the data) is presented, and, at the same time, a signal for prohibiting the rewinding is applied to turn on the switching transistor 108. (Discussion is conducted here on assumption that the external extension RAM 105 stores the data to be imprinted whatever).

Step S14: The data are corrected according to the input from the console 102.

Step S15: Test if there is produced an "off" signal for the switching transistor 108, or whether the rewind key 11 is on or off. In the case of "off", return to the step S14. Otherwise, advance to a step S16.

Step S16: To remove the prohibition of rewinding, the "off" signal is given to the switching transistor 108.

Here, in connection with the foregoing steps from S12 to S16, the operations of the camera and the data imprinting device are described in detail by reference to FIG. 3 and FIGS. 4(a) to 4(f), except for the data correcting operation which is not relevant to the present invention, and, therefore, is not further described here.

Suppose the frame which is exposed when the signal contact 26 is in the position STP2 (area C) of FIG. 4(b) is the last one of the film 12. Then, at an intermediate point during the subsequent winding operation, the film 12 will once be stretched. This state is, as has been described above, detected by the camera control circuit 106 when the output P1 stops to pulsate (or its period T increases from the critical time), despite the film 12 does not advance through the full length of one frame yet. The current supply to the windup motor (not shown) is thereby stopped, and data representing that the camera has been switched to the rewind mode is sent to the data imprinting device 2.

Meanwhile, receiving such data from the camera, the microcomputer 100 actuates the display drive circuit 103, causing the LCD 3 capable of displaying 30 characters at once to make a warning display (not shown) that urges the photographer to ascertain the data to be imprinted. At the same time, because of the storage of the imprinted data in the external extension RAM 105, the I/O 100h produces a signal of a high level which is applied to turn on the switching transistor 108. As a result, despite the detection of the film stretching (by the film position signal) which has switched the camera to the rewind mode, a rewinding operation is not initiated by the signal of a high level applied from the camera control circuit 106 to the switching transistor 107 for the rewind motor 19, because the switching transistor 108 has been turned on to hinder the switching transistor 107 from being turned on, (that is, the rewinding operation from being initiated). Thus, the detection of the occurrence of the film stretching is not immediately (automatically) followed by the initiation of the rewinding operation. Note, if no data are to be imprinted in any of the frames (the external extension RAM 105 stores no data to be imprinted at all), the switching transistor 108 remains off, permitting the rewinding operation to start immediately. As for the correction of the data in the step S14, no more explanation is given here.

Next, to start the rewinding, the photographer pushes down the rewind key 11, thereby changing the output of the I/O 100h in the microcomputer 100 of FIG. 3 from a high to a low level. Such a change causes the switching transistor 108 to turn off. Thus, the rewinding is released from the prohibition. Therefore, the switching transistor 107 turns on to start a current supply to the rewind motor 19 and rotate it in the rewind direction.

Returning again to FIG. 6, the flowchart is further explained from the step S17 downward. Though a brief description is given to the steps individually, a sequence of them will be later described in great detail.

Step S17: Receive the data from the camera.

Step S18: Test if the rewind start signal has been sent in the step S17. Then advance to a step S19.

Step S19: Examine whether or not the film rewinding is interrupted, or the data representing that the film rewinding has not normally been carried out is sent. If not, then advance to a step S20. Otherwise, advance to a step S28.

Step S20: Receive data again from the camera. These data are the rewind end signal, the imprint signal or padding pulses corresponding to the period for which the imprinting is not carried out, etc. (that is, the imprint timing signals).

Step S21: Test if the rewind end signal has been sent. Then, advance to a step S27. Or otherwise, advance to a step S22.

Step S22: Test if the data representing the failure of the normal rewinding has not been sent. Then, advance to a step S23. Or otherwise, advance to a step S28.

Step S23: Test if the imprint signal has been sent. Then, advance to a step S24. Or otherwise, return to the step S17.

Step S24: Test if the padding pulses have been sent. Then, return to the step S20. Or otherwise, advance to a step S25.

Step S25: Imprint one character for one cycle of reception of the imprint signal in the preceding step S23. Upon termination, advance to a step S26. Hence, in this embodiment, this operation is recycled 30 times at most per frame.

Step S26: Decrement one the imprinted data pointer.

When the sequence of the foregoing steps S20 to S26 has been recycled the equal number times to the total number of frames exposed, as the rewinding has operated normally, the rewind end signal is detected in the step S21. Then, advance to a step S27.

Step S27: Set the imprinted data pointer to the initial position.

Now assuming that an accident has happened at a time during the rewinding operation, then this is detected in the step S19 or S22, and jump to a step S28 occurs.

Step S28: Set the imprinted data pointer to the head of the next exposed frame.

Step S29: Receive data from the camera. This data represents whether or not the rewinding is re-started by the rewind motor 19.

Step S30: Test if the rewinding has been re-started. Then advance to a step S31. Or otherwise, return to the step S29.

Step S31: Receive data again from the camera. This data represents whether or not a rewind start signal for the next exposed frame (to the frame which was in registry with the LED array 14 when the rewinding stopped) has been sent.

Step S32: Test if that rewind start signal has been sent. Then, return to the step S20. Or otherwise, return to the step S31.

After that, the loop of the steps S20 to S26 is repeated. As a result, when the rewind end signal is detected in the step S21, similar to the case described in connection with the normal rewinding until the last, jump to the step S27 occurs and the imprinted data pointer is reset to the initial position.

Upon the above, a sequence of the operations has terminated. Here, in connection with the steps S17 to S32, the operations of the camera and the data imprinting device 2 are described in greater detail by reference to FIG. 3 and FIGS. 4(a) to 4(f).

As for the above-described film stretching, it is uncertain where it occurs on the encoder 27 of FIG. 4(a). In other words, it can take place anywhere over all the regions A to C. In the embodiment of the invention, the data to be imprinted, when photographing, are put into the external extension RAM 105 and, when film rewinding, are read out therefrom either as they stand or after they have been corrected prior to the start of the rewinding, and the lighting on and off operation of the LED array 14 is controlled in accordance with the read data. If each set of data to be imprinted is not in one-to-one correspondence with each frame even when in the rewind mode, a grave problem will arise that different data or information from those with which the shots was taken, (for example, the data or information for another frame in advance or behind by at least one), are imprinted. It is, therefore, indispensable that with the rewinding after the film stretching, traverse of a corresponding point to the last exposed frame across the LED array 14 is detected reliably (head-indexing is carried out) before exposure of the data for the last exposure frame is made by lighting on and off the LED array 14.

As has been described above, the film can be stretched at any position in all the regions A to C on the encoder 27. In this embodiment, therefore, use is made of a head index for the last exposed frame defined as the simultaneous occurrence of the outputs P1 and P2 of a high level, (or the transit of the signal contact 26 across the area C), which follows the start of rewinding (the start of rotation of the signal contact 26 in the direction of arrow Y in FIG. 4(a)). After this index has been detected, the imprinting operation of the last exposed frame is allowed to start. Even for the case of accidental interruption of the rewinding, the re-start of rewinding is followed by a similar indexing operation, the only difference being that instead of the last exposed frame, the next one to that frame which came across the LED array 14 when the rewinding stopped is chosen to be head-indexed again. After having produced the indexing signal, the encoder 27 produces a train of pulses at the output P1 with the period corresponding to the rewind angle α, as the signal contact 26 moves on the region A. In this embodiment, the imprinting device is so designed that exposure of one digit of the data is made within the period of one pulse.

Here, the pulses in one continuous series for each frame are numbered 1 to 43 consecutively (from the left in FIG. 4(c)). To create a desired head (left) margin L2, the 1st to 9th pulses are used to hinder the LED array 14 from being lighted on and off, (that is, these nine pulses become padding pulses). Then, thirty alphanumeric characters at most are imprinted within an area of maximum length L3. The following 10th to 39th pulses are assigned to this purpose. In the 40th to 43rd pulses, the LED array 14 is again hindered from lighting on and off.

As the rewinding goes on one more step of angle α, the simultaneity of the outputs P1 and P2 of a high level occurs again. After this, the next continuous series of pulses P1 are produced, based on which the next frame is imprinted with the data. Such a procedure is repeated until the first exposed frame is imprinted.

Next, how to take timing of each cycle of the exposure operation of the LED array 14 is described.

Even after the very early stage of the rewinding process, the speed of movement of the film 12 is not exactly constant. Since each character is expressed in the form of a dot matrix, this leads to a danger of making uneven the pitch between the adjacent two dots and the character width at random. To avoid this, such instability must be absorbed. In this connection, reference is made to FIGS. 4(d), 4(e) and 4(f).

FIG. 4(d) in enlarged scale illustrates the 9th and 11th pulses of FIG. 4(c) with the abscissa in time. Their periods labeled T9, T10 and T11 are assumed to appreciably differ from one another. The LED array 14 has 7 LEDs in a vertical row. With this, in order to form the character in $5 \times 7$ dot matrix, the on-and-off operation of each of the LEDs must be recycled 5 times within the period of one pulse P1. Also, a proper blank space must be given between the adjacent two characters. For these reasons, each period is divided into 7 equal parts, of which the first five are assigned to the net space of the character so that the character is formed in 5/7 of the period, and the remaining two to the blank space. FIG. 4(e) illustrates a train of control pulses for lighting on and off each LED, and FIG. 4(f) shows what characters in $5 \times 7$ dot matrix are formed in the successive three periods T10, T11 and T12.

For a given period of the output P1, say the 10th period for the first character to be imprinted, it is by the preceding period of the 9th pulse that the period of the cycle of on-and-off operation of the LED array 14 is determined, that is, being equalized to (T9)/7. Further, the LED array 14 is lighted on once for less than (T9)/14. This implies that the distance the film moves during the time when it lights on becomes shorter than ½ of the distance between the adjacent two dots. Thus, a desired level of resolution between the dots is obtained, constituting a necessary condition of maintaining high the quality of the imprinted characters. For the subsequent characters in the 11th and 12th pulses, the periods of the dot control pulses are set to (T10)/7 and (T11)/7 respectively.

In such a manner, by the preceding output P1 by one character (one pitch which is sufficiently small in relation to the length of one frame of film), a determination is made of the period for imprinting the present character and the dot distance, or the lighting on and off period of the LED array 14. Even when the film speed changes during the rewinding operation, a sufficient coping can be taken. Thus, the character width and the dot spacing can be maintained constant.

Figure 7:
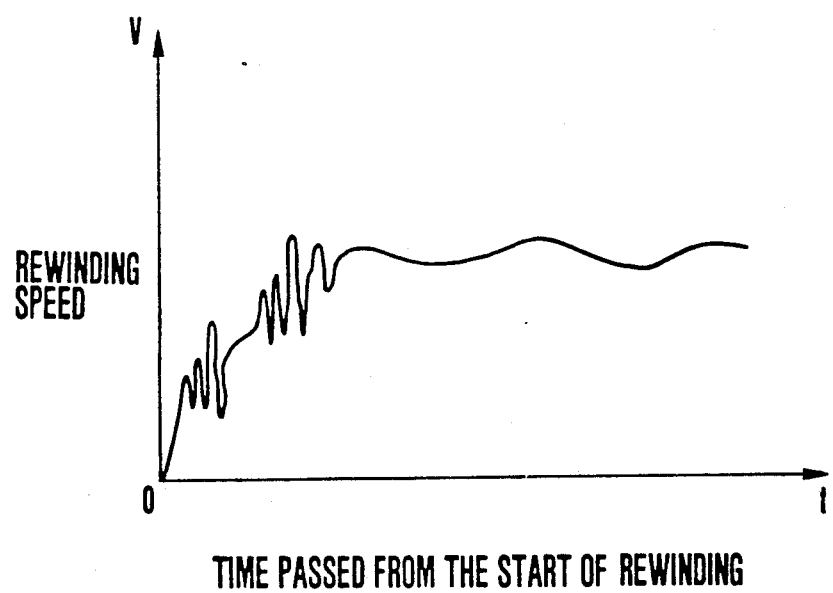
FIG. 7 is a graph of the general case of variation of the speed of movement of the film after the start of film rewinding.

Meanwhile, it is in the very early stage of the rewinding process that, as has been described by using FIG. 7, the speed of movement of the film 12 varies to a large extent. Therefore, even if the above-described absorbing technique is applied, such a variation of the speed cannot be fully removed. That is, for the last exposed frame, it is difficult to suppress the range of variation of the character width and the dot pitch to such a level as not to take them as uneven. (If the pitch on the patterns 27a on the encoder 27 is further shortened, it would become possible to achieve this. But there is a limitation on its reduction). In this embodiment, therefore, as shown in FIG. 2(a), the positioning of the LED array 14 with the optical system 15 in the space between the aperture 22 and the cartridge chamber is made as close to the film cartridge 18 as possible, thereby providing a possibility of creating a time space between the start of rewinding and the initiation of the imprinting operation that is sufficiently long to allow for the speed detection to be skipped over the short time of the large variation of the film feeding speed soon after the start of rewinding. After the speed is stabilized relatively well, the imprinting of the data may be started, and can be performed based on the stabilized speed, so that, even in the last exposed frame, it is possible to prevent the character width and the dot spacing from differing at random.

Further, even when the rewinding is re-started after the normal rewinding has failed, the speed of the film 12 varies to a large extent as has been described in connection with the prior art. The above-described speed control technique is not able to fully absorb such a variation. That is, for the frame in which the imprinting operation is accidentally interrupted when the rewinding stops, even if the remaining part of the set of data is imprinted on that frame, it is impossible to equalize the widths of the later imprinted characters and the spaces therebetween to those of the previously imprinted ones. Also, there is some possibility of stopping the film at a position where the LED array 14 lies at or near the central line of the picture frame, on either side of which are imprinted the date and the values of the exposure factors. So, in the invention, the remaining part of the set of data for the frame of accident is not imprinted at all, and the subsequent imprinting operation is re-started with the next frame. Hence, as in the case when it happens that the film stops before it is fully rewound, no illegible data whatever are permitted to be imprinted. This enables the photographs to be taken without suffering ugly forms of the imprinted data.

Another advantage arising from the fixation of the LED array 14 and optical system 15 to the presser plate 13 is that even when the film 12 waves, the LED array 14 and the optical system 15 never change their position relative to the film 12 (they follow up the motion of the film 12) so that the size of the imprinted dot is maintained constant. Therefore the characters can be imprinted as easy to read.

Though the embodiment of the invention has been described in connection of the use of the RAM 106a which is arranged on the camera side as the means for memorizing the fact that the film rewinding has not normally been carried out to the end, it is also possible to use an EEPROM which is also arranged on the camera side, or the RAM 100b which is incorporated within the data imprinting device in combination with means for transferring that data from the camera to the device.

Also, though the invention has been described as applied to the device of the type in which the data are imprinted during the film rewinding, it is to be understood that the invention is applicable to another type in which the data are imprinted during the winding-up of film. Even in this case, an equivalent result can be effected. For this case, a modification must be made such that the LED array 14 and the imprinting optical system 15 is arranged in a space of th presser plate 13 between the aperture 22 and the takeup spool chamber at as close a location to the takeup spool 29 as possible.

As has been described above, according to the invention, it is made possible for the data imprinting device of the type in which the data are imprinted during the transportation of the film to prevent illegible data from being imprinted and improve the uniformity of the spaces between the alphanumeric characters of the data and the sharpness of the imprinted characters despite the instability of the axial position of the film, thereby giving a great advantage that the photographs taken with the imprinted data will be found to be comfortable to view.

What is claimed is:

1. A data imprinting device for a camera for imprinting data on an image recording means during transportation of the image recording means, comprising:
   (A) a presser plate for pressing the image recording means closely against an aperture of the camera; and
   (B) data light projecting means for projecting data light onto the image recording means, said data light projecting means being fixed to said presser plate at a position out of the aperture in a direction in which the image sensitive recording means advances when data is imprinted on the image recording means.

2. A device according to claim 1, wherein the position at which said data light projecting means is fixed is on the side of said presser plate close to a film cartridge chamber.

3. A device according to claim 1, wherein the data light projecting means includes dot imprinting means for forming a data character with dots.

4. A device according to claim 1, wherein the data light projecting means is arranged to operate during the rewinding of the sensitive member.

5. A device according to claim 1, wherein said data light projecting means is fixed to said presser plate at a position spaced from the aperture in a direction in which the image recording means advances when data is imprinted on the image recording means.

6. A data imprinting device for a camera for imprinting data on an image recording means during transportation of the image recording means, comprising:
   data imprinting means for imprinting data on the image recording means;
   transportation means for transporting the image recording means; and
   prohibition means for prohibiting an operation of said data imprinting means until the image recording means has advanced to the next frame when said transportation means has stopped during transportation of the image recording means.

7. A device according to claim 6, wherein said data imprinting means includes dot imprinting means for forming a data character with dots.

8. A device according to claim 6, wherein said data imprinting means is arranged to operate during the rewinding of the sensitive member.

9. A device according to claim 6, wherein said prohibition means includes memory means for memorizing that said transportation means has stopped halfway through a frame of the image recording means.

10. The device according to claim 6, wherein said prohibition means prohibits an operation of said data imprinting means until the image recording means has advanced to the next frame when said transportation means has stopped halfway through a frame of the image recording means during transportation of the image recording means.

11. A data recording device for a camera for recording data on an image recording means during transportation of the image recording means, comprising:
a presser plate for pressing the image recording means closely against an aperture of the camera; and
data imprinting means for imprinting data onto the image recording means, said data imprinting means being fixed to said presser plate at a position out of the aperture in a direction in which the sensitive member advances when data is recorded on the image recording means.

12. A device according to claim 4, wherein the position at which said data imprinting means is fixed is on the side of said presser plate close to a film cartridge chamber.

13. A device according to claim 4, wherein said data imprinting means includes dot imprinting means for forming a data character with dots.

14. A device according to claim 4, wherein said data imprinting means is arranged to operate during the rewinding of the image recording means.

15. The device according to claim 4, wherein said data light projecting means is fixed to said presser plate at a position spaced from the aperture in a direction in which the image recording means advances when data is imprinted on the image recording means.

16. A data recording device for a camera for recording data on an image recording means during transportation of the image recording means, comprising:
data recording means for recording data on the image recording means;
transportation means for transporting the image recording means; and
prohibition means for prohibiting an operation of said data recording means until the image recording means has advanced to the next frame when said transportation means has stopped during transportation of the image recording means.

17. A device according to claim 16, wherein said data recording means includes dot imprinting means for forming a data character with dots.

18. A device according to claim 16, wherein said data recording means is arranged to operate during the rewinding of the image recording means.

19. A device according to claim 16, wherein said prohibition means includes memory means for memorizing that said transportation means has stopped halfway through a frame of the image recording means.

20. The device according to claim 16, wherein said prohibition means prohibits an operation of said data imprinting means until the image recording means has advanced to the next frame when said transportation means has stopped halfway through a frame of the image recording means during transportation of the image recording means.

21. A camera having a data imprinting device for imprinting data on an image recording means during transportation of the image recording means, comprising
a camera body for holding the image recording means;
a presser plate, attached to said camera body, for pressing the image recording means closely against an aperture of the camera; and
data light projecting means for projecting data light onto the image recording means, said data light projecting means being fixed to said presser plate at a position spaced out of the aperture in a direction in which the image recording means advances when data is imprinted on the image recording means.

22. The device according to claim 21, wherein said data light projecting means is fixed to said presser plate at a position spaced from the aperture in a direction in which the image recording means advances when data is imprinted on the image recording means.

23. A camera having a data imprinting device for imprinting data on an image recording means during transportation of the image recording means, comprising:
a camera body for holding the image recording means;
data imprinting means for imprinting data on the image recording means;
transportation means for transporting the image recording means; and
prohibition means for prohibiting an operation of said data imprinting means until the image recording means has advanced to the next frame when said transportation means has stopped during transportation of the image recording means.

24. The device according to claim 23, wherein said prohibition means prohibits an operation of said data imprinting means until the image recording means has advanced to the next frame when said transportation means has stopped halfway through a frame of the image recording means during transportation of the image recording means.

25. A camera having a data recording device for recording data on an image recording means during transportation of the image recording means, comprising:
a camera body for holding the image recording means;
a presser plate for pressing the image recording means closely against an aperture of the camera; and
data imprinting means for imprinting data onto the image recording means, said data imprinting means being fixed to said presser plate at a position out of the aperture in a direction in which the image recording means advances when data is recorded on the sensitive member.

26. The device according to claim 25, wherein said data light projecting means is fixed to said presser plate at a position spaced from the aperture in a direction in which the image recording means advances when data is imprinted on the image recording means.

27. A camera having a data recording device for recording data on an image recording means during transportation of the image recording means. comprising:
- a camera body for holding the image recording means;
- data recording means for recording data on the image recording means;
- transportation means for transporting the image recording means; and
- prohibition means for prohibiting an operation of said data recording means until the image recording means has advanced to the next frame when said transportation means has stopped during transportation of the image recording means.

28. The device according to claim 20, wherein said prohibition means prohibits an operation of said data imprinting means until the image recording means has advanced to the next frame when said transportation means has stopped halfway through a frame of the image recording means during transportation of the image recording means.

* * * * *

UNITED STATES PATENT AND TRADEMARK OFFICE
CERTIFICATE OF CORRECTION

PATENT NO. : 5,119,119

DATED : June 2, 1992

INVENTOR(S) : Amano et al.

Page 1 of 4

It is certified that error appears in the above-identified patent and that said Letters Patent is hereby corrected as shown below:

ON THE TITLE PAGE:

[56] REFERENCES CITED:

FOREIGN PATENT DOCUMENTS

"60-254123 5/1984 Japan." should read --60-254123 12/1985 Japan.--.

[57] ABSTRACT:

Line 7, "prohibitor" should read --prohibitor,--; and

Line 11, "making" should be deleted.

COLUMN 1:

Line 35, "slaking" should read --slacking--; and

Line 44, "intervals" should red --intervals,--.

COLUMN 2:

Line 24, delete "are taken to"; and

Line 48, change "date the" to --date, the--.

UNITED STATES PATENT AND TRADEMARK OFFICE
CERTIFICATE OF CORRECTION

PATENT NO. : 5,119,119
DATED : June 2, 1992
INVENTOR(S) : Amano et al.

It is certified that error appears in the above-identified patent and that said Letters Patent is hereby corrected as shown below:

COLUMN 3:

Line 26, "waves" should read --waving--; and

Line 34, delete "whole".

COLUMN 5:

Line 12, "position STP" should read --position STP2--.

COLUMN 7:

Line 3, delete "looking".

COLUMN 9:

Line 16, "when ... the" should read --when the--; and

Line 40, "was" should read --were--.

COLUMN 11:

Line 60, "Therefore" should read --Therefore,--.

UNITED STATES PATENT AND TRADEMARK OFFICE
CERTIFICATE OF CORRECTION

PATENT NO. : 5,119,119　　　　　　　　　Page 3 of 4
DATED : June 2, 1992
INVENTOR(S) : Amano et al.

It is certified that error appears in the above-identified patent and that said Letters Patent is hereby corrected as shown below:

COLUMN 12:

Line 11, "th" should read --the--;

Line 23, "comfortable" should read --easy--;

Line 36, "sensitive" should be deleted;

Line 43, "the" should read --said--;

Line 46, "the" should read --said--;

Line 48, "sensitive member." should read --image recording means.--; and

Line 49, "A" should read --The--.

COLUMN 13:

Line 3, Q: "sensitive member." should read --image recording means.--;

Line 27, "claim 4," should read --claim 11,--;

Line 31, "claim 4," should read --claim 11,--;

Line 34, "claim 4," should read --claim 11,--; and

Line 37, "claim 4," should read --claim 11,--.

UNITED STATES PATENT AND TRADEMARK OFFICE
CERTIFICATE OF CORRECTION

PATENT NO.  : 5,119,119

DATED       : June 2, 1992

INVENTOR(S) : Amano et al.

It is certified that error appears in the above-identified patent and that said Letters Patent is hereby corrected as shown below:

COLUMN 14:

Line 6, "ing" should read --ing:--; and

Line 61, "sensitive member." should read
    --image recording means.--.

COLUMN 16:

Line 3, "claim 20," should read --claim 27,--.

Signed and Sealed this

Twenty-first Day of September, 1993

Attest:

BRUCE LEHMAN

Attesting Officer

Commissioner of Patents and Trademarks